United States Patent [19]

Jenkins

[11] Patent Number: 4,520,177

[45] Date of Patent: May 28, 1985

[54] POLYMERIZATION OF CONJUGATED DIENES

[76] Inventor: Derek K. Jenkins, 7, Lakewood Rd., Ashurst, Southampton, England

[21] Appl. No.: 612,801

[22] Filed: May 22, 1984

[30] Foreign Application Priority Data

May 24, 1983 [GB] United Kingdom ............... 8314382

[51] Int. Cl.$^3$ ............................................. C08F 4/12
[52] U.S. Cl. ................................. 526/151; 526/157
[58] Field of Search ............. 526/164, 160, 161, 154, 526/151

[56] References Cited

U.S. PATENT DOCUMENTS 3,708,551 1/1973 Kittleman .......................... 526/151
4,384,982 5/1983 Martin ................................ 526/161

*Primary Examiner*—Paul R. Michl
*Attorney, Agent, or Firm*—Cushman, Darby & Cushman

[57] ABSTRACT

The invention relates to a method of polymerizing one or more conjugated diene monomers to a polymer having an exceptionally high cis content employing a three component catalyst comprising (a) a rare earth compound, (b) an organo magnesium compound and (c) a Lewis acid in which a particular order of component addition is used. Under optimum conditions it is possible to obtain nearly 100% conversion to polymers of 98% or more cis content at very low concentrations of rare earth compound with respect to monomer.

21 Claims, No Drawings

POLYMERIZATION OF CONJUGATED DIENES

This invention relates to the polymerisation of one or more diene monomers using a catalyst system containing a compound of a rare earth element. In particular the invention relates to the polymerisation of one or more conjugated diene monomers to a polymer having an exceptionally high content of cis isomer.

In our British patent application No. 2118,199A we have described and claimed a catalyst system containing a compound of a rare earth element and the use of such a system in the homopolymerisation of a conjugated diene with one or more other conjugated dienes. The said catalyst system comprises essentially component (a), a salt of a rare earth element or a complex of a rare earth element and component (b), an organo magnesium compound. Optionally an additional component (c) which is a Lewis acid, such as ethyl aluminium sesquichloride or bromide, ethyl aluminium dichloride or diethyl aluminium chloride, may be included. When components (a) and (b) are used alone, the product polymer has a very high content of trans 1,4 isomer. However use of the additional component, (c), changes the reaction mechanism to give a product polymer having a very high content of cis 1,4 isomer.

We have now found that a particular order of component addition in the preparation of the three component catalyst gives a polymer product of exceptionally high cis content. Furthermore a considerable increase in catalyst activity may be obtained. Using this procedure under optimum conditions it is possible to obtain nearly 100% conversion to 98% or more cis polymer at very low component (a) concentrations e.g. 0.05 mmole of component (a) per hundred grams of butadiene.

According to the present invention a process for the polymerisation of one or more conjugated diene monomers by means of a catalyst comprising
(a) a salt of a rare earth element or a complex of a rare earth element,
(b) an organo magnesium compound, and
(c) a Lewis acid
is characterised by mixing component (a) with component (c), before contact with component (b) and preferably in the presence of monomer.

We have found that the order of addition: solvent, monomer, component (c), component (a) and finally component (b) is especially favourable in terms of conversion of monomer to polymer and the cis content of the polymer product which, at optimum catalyst levels, is at least 98%.

It is particularly surprising that the order of catalyst component addition of the invention has a marked effect on catalyst activity and cis content, since other prior art references in this rare earth catalyst field, relating to catalysts which do not contain an organo magnesium compound as an essential component, indicate that the order in which the catalyst components are brought into contact is not important (e.g. European Patent Application Nos. 0076,535 and 0092270, G.B. patent application Nos. 2101616 and 2002003 and U.S. Pat. No. 4,260,707).

The rare earth element in component (a) of the catalyst may be any of those having an atomic number of 57 (lanthanum) to 71 (lutetium). However, the polymerisation activity of certain of these elements, e.g. samarium, in previously described catalysts is low, see for example FIG. 9 in Chapter 2 of Elastomers & Rubber Elasticity "Synthetic Aspects of Crystallizable Elastomers" Mario Bruzzone (copyright 1982 American Chemical Society). A compound of praseodymium, neodymium, gadolinium, terbium or dysprosium is preferred. A compound derived from a mixture of two or more rare earth elements e.g. didymium (which is a mixture of rare earth elements containing approximately 72% neodymium, 20% lanthanum and 8% praseodymium) may be used. A neodymium compound is especially preferred. Preferably component (a) is soluble in hydrocarbon polymerisation medium. Carboxylates, alkoxides and diketones are preferred since they are readily soluble in hydrocarbon polymerisation medium. Examples of compounds for use as component (a) are neodymium "versatate", (derived from versatic acid, ("Versatic" is a trade mark of Shell Chemicals), a synthetic acid composed of a mixture of highly branched isomers of $C_{10}$ monocarboxylic acids, sold by Shell Chemicals), neodymium n-butoxide, neodymium naphthenate and praseodymium (2,2,6,6-tetramethyl-3,5-heptane dione). Neodymium "versatate" is particularly preferred on the grounds of ready solubility, ease of preparation and stability.

Component (b) of the catalyst is an organo magnesium compound. Dihydrocarbyl magnesium compounds of formula $R_2Mg$ where each R, which may be the same or different, is for example, an alkyl (including cycloalkyl), aryl, aralkyl, allyl or cyclodiene group, especially dialkyl magnesium compounds, where each alkyl group has from 1 to 10 carbon atoms, are preferred. Preferably component (b) is soluble in hydrocarbon polymerisation medium. Magnesium dibutyl is particularly preferred on the grounds of ease of availability and solubility. Another example of a hydrocarbon soluble magnesium dialkyl is butyl octyl magnesium which is available as a 20 percent solution in heptane from Schering AG.

Other suitable diorganomagnesium compositions which are soluble in acyclic liquid hydrocarbons are described in U.S. Pat. No. 4,069,267. The disclosures of this patent specification include the preparation of a stable complex of (a) a di-n-butyl magnesium in which the alkyl contains from 1 to 4 carbon atoms with (b) a di-n-alkyl magnesium in which the alkyl contains from 6 to 18 carbon atoms. A typical example is a di-n-butyl magnesium-di-n-octyl magnesium complex. The present invention includes the use of hydrocarbon soluble complexes containing dialkyl magnesium such as the complexes described in the aforementioned U.S. patent and also the complex known as Magala-7.6E which is supplied as a 10% solution in heptane by Texas Alkyls Inc. of Deer Park Tex. and which also contains triethyl aluminium. The organo magnesium compound may also be a hydrocarbon soluble Grignard reagent of formula RMgX where R is a hydro-carbyl group such as exemplified above and X is chlorine, bromine or iodine.

Component (c) is a Lewis acid. A Lewis acid which is a compound of aluminium is particularly suitable, especially an aluminium alkyl halide such as ethyl aluminium sesquichloride, diethyl aluminium chloride or ethyl aluminium dichloride. Other examples are ethyl aluminium sesquibromide and aluminium tribromide. Mixtures of Lewis acids may be used if desired.

All three components of the catalyst are essential to obtain high cis polymer. Omission of the Lewis acid component, (c), gives a high trans polymer. On the other hand, omission of the magnesium alkyl component (b), produces only very small amounts of polymer, if any.

Reaction is preferably carried out in hydrocarbon reaction medium, and it is very desirable that all three catalyst components are soluble in the reaction medium used. An aliphatic hydrocarbon, e.g. hexane, or cycloaliphatic hydrocarbon, e.g. cyclohexane, or toluene is preferred as reaction medium.

The reaction temperature may vary within wide limits e.g. 0° C. to 200° C. but a temperature of 0° to 90° C., is convenient, more preferably 20° C. to 80° C. Reaction pressure is that of the vapour pressure of the monomer(s) under the reaction conditions used. Molecular weight increases with polymerisation time suggesting a catalyst system which is at least partially living.

Examples of conjugated diene monomers which may be polymerised by the process of the invention are those having 4 to 10 carbon atoms, preferred examples being butadiene, isoprene and 1,3 pentadiene. Mixtures of conjugated dienes may be used if desired, e.g. to prepare isoprene-butadiene copolymer.

The molar ratio of component (a) to component (b) is preferably 0.01:1 to 0.5:1, more preferably 0.06:1 to 0.3:1. The molar ratio of component (c) to component (b) is generally at least 0.5:1. The ratio of halide in component (c) to rare earth metal in component (a) is preferably 12:1 to 17:1. If there is insufficient halide, both yield and cis content are usually lower. On the other hand if there is too much halide, cis content may be high enough but the catalyst tends to precipitate and yields of polymer are generally lower. The amount of magnesium alkyl employed may be reduced from a molar ratio of (a) to (b) of e.g. 1:10 to a molar ratio of 1:6 with little, if any, effect on conversion, molecular weight or cis content at a constant component (c) concentration.

Absolute concentrations of component (a) may be very low, for example, 0.05 millimoles per hundred grams of polymerisable monomer up to e.g. 1 millimole per hundred grams, suitably 0.05 to 0.26 mM.

Polybutadienes of cis content of at least 98% have good crystallisation properties, excellent processability, tack and green strength and give vulcanisates having improved physical properties. The polymers formed by the processs of the invention tend to be of a very high molecular weight e.g. 500,000 to 1,000,000 or more, as measured by intrinsic viscosity and are capable of absorbing large quantities of oil to produce an oil extended polymer of good consistency and high strength.

A very surprising feature of the polymerisation process according to the invention is that the solutions become quite viscous within 2 to 3 minutes of adding the catalyst, even at low catalyst concentrations, indicating very rapid initiation. This behaviour is quite unlike that shown by other rare earth catalyst systems, eg Nd butoxide-AlEtCl$_2$-AlBu$_2$H.

The following Examples illustrate the invention:

COMPARISON EXAMPLE

In this example, neodymium versatate—Nd(C$_9$H$_{19}$CO)$_3$—was used as component (a) of the catalyst. It was prepared by reacting sodium versatate (obtained from "versatic" 10 acid sold by Shell Chemicals, "versatic" being a Shell Trade Mark) with neodymium chloride in aqueous solution to give a sticky white precipitate which was then extracted with toluene. The toluene solution was evaporated to dryness using a Buchi evaporator and the solid extracted with toluene and filtered into bottles.

A crown capped bottle was part filled with hexane (75 ml.) and butadiene (16.3 g.) was added. Neodymium "versatate" (hereinafter "NdV$_3$") was injected to give an NdV$_3$ concentration of 0.26 m.Mole per 100 g of butadiene. A hexane solution of di-n-butyl magnesium was then injected to give an NdV$_3$ to MgBu$_2$ molar ratio of 0.1:1, followed by a hexane solution of diethyl aluminium chloride to give a molar ratio of Et$_2$AlCl to MgBu$_2$ of 1.5:1. The bottle was then placed in a waterbath at 50° C. After a polymerisation time of 16 hours the polymer product was isolated. Yield of polymer was 16.2 g. (99.4% conversion) and the polymer microstructure was trans 1,4 6.6%; cis 1,4 92.4% and vinyl 1.0%.

EXAMPLE 1

The procedure of the comparison example above was repeated except that diethyl aluminium chloride solution was injected first followed by the neodymium "versatate" and then the magnesium dibutyl to give a molar ratio of AlEt$_2$Cl to MgBu$_2$ of 1.67:1 and the amount of butadiene was 14.6 g.

The NdV$_3$ to MgBu$_2$ molar ratio and the concentration of the NdV$_3$ based on butadiene were unchanged. The yield of polymer was 14.6 g. (100% conversion) and the polymer microstructure was trans 1,4 3.6%; cis 1,4 96.1% and vinyl 0.1%. The polymer contained virtually no gel.

The dibutyl magnesium used in these and the following examples was a 14.1% solution in hexane as supplied by Lithium Corporation of Europe.

EXAMPLES 2 AND 3

The procedure of example 1 was repeated with the following variations.

| Ex. | Amount of butadiene (g) | AlEt$_2$Cl: MgBu$_2$ | NdV$_3$ concn. |
|-----|-------------------------|----------------------|----------------|
| 2   | 17.1                    | 1.5:1                | 0.13 mM        |
| 3   | 13.7                    | 1.5:1                | 0.09 mM        |

Polymerisation began immediately the magnesium dibutyl solution was injected and the contents of the bottle was already visibly viscous after 3 minutes at 20° C., before the bottles were even placed in the water bath. On isolation of the polymer, the results obtained were:

| Ex. | Yield (g) | Conversion (g) | Trans % | Cis % | Vinyl % |
|-----|-----------|----------------|---------|-------|---------|
| 2   | 16.6      | 97.1           | 1.6     | 98.0  | 0.4     |
| 3   | 13.4      | 97.8           | 1.3     | 98.4  | 0.3     |

EXAMPLE 4 (COMPARISON)

Example 3 was repeated using 15.7 g of butadiene except that the order of addition of the catalyst components was component (c), component (b) and finally component (a), i.e. component (a) mixed with component (c) after contact with component (b). Yield of polymer was only 6.0 g (38.2% conversion) and the cis content was reduced to 93.1% (6.0% trans; 0.9% vinyl).

EXAMPLES 5 TO 8

The procedure of Example 1 was repeated using lower catalyst concentrations (based on neodymium) at an AlEt$_2$Cl:Nd:Mg ratio of 1.5:0.1:1. In Example 7 neodymium tri n-butoxide was used in place of NdV₃. The polymerisation reactions were carried out at 50° C. except in Example 8 where a polymerisation temperature of 20° C. was used.

| Example | Amount of butadiene (g) | NdV₃ concn. |
|---|---|---|
| 5 | 17.3 | 0.07 |
| 6 | 16.2 | 0.05 |
| 7 | 14.8 | 0.09* |
| 8 | 16.7 | 0.09 |

*Nd(O$_n$Bu)₃

In Example 8 the contents of the bottle was completely solid after only 45 minutes. On isolation of the polymer the results obtained were:

| Example | Yield (g) | Conversion (%) | Trans % | Cis % | Vinyl % |
|---|---|---|---|---|---|
| 5 | 17.0 | 98.3 | 2.0 | 97.5 | 0.3 |
| 6 | 16.1 | 99.4 | 1.5 | 98.0 | 0.5 |
| 7 | 14.4 | 97.3 | 3.4 | 95.9 | 0.7 |
| 8 | 16.4 | 98.2 | 1.2 | 98.5 | 0.3 |

EXAMPLES 9-12

The procedure of Example 1 was repeated using aluminium ethyl dichloride (Examples 9 & 10) and ethyl aluminium sesquichloride (Examples 11 & 12) as Lewis acid instead of diethyl aluminium chloride. NdV₃ concentration was 0.09 m.Mole/100 g. of butadiene and the NdV₃ to MgBu₂ molar ratio was 0.1:1 in each case.

In examples 9 and 10 the aluminium ethyl dichloride to MgBu₂ molar ratio was 0.75:1 and in examples 11 & 12 the sesquichloride to MgBu₂ molar ratio was 1:1. Examples 9 & 11 were carried out at 50° C. and Examples 10 & 12 at room temperature. The amount of butadiene used in each example together with the yield, conversion and stereo-structure of the polymer product are given below.

| Example | Amount of butadiene (g) | Yield (g) | Conversion (%) | Trans (%) | Cis (%) | Vinyl (%) |
|---|---|---|---|---|---|---|
| 9 | 14.0 | 13.8 | 98.6 | 1.2 | 98.4 | 0.4 |
| 10 | 14.1 | 13.9 | 98.6 | 0.6 | 99.0 | 0.4 |
| 11 | 14.5 | 14.2 | 97.9 | 1.2 | 98.1 | 0.7 |
| 12 | 13.2 | 12.7 | 96.2 | 0.9 | 98.6 | 0.5 |

EXAMPLES 13 TO 23

The above examples 1 to 12 were carried out at a molar ratio magnesium component (b) to rare earth component (a) of 10:1 (i.e. (a):(b)=0.1:1). In the following examples 13 to 23 the (b):(a) molar ratio was varied. In examples 13 to 18 the aluminium component (c) to magnesium component (b) molar ratio was constant at 1.5:1 (i.e. the component (c) to (a) ratio was also varied). In examples 18 to 23 the (c) to (a) molar ratio was constant at 15:1. The procedure used in each of Examples 13 to 23 was that used in Example 1 that is, using the following reaction conditions:
Polymerisation temperature=50° C.
Polymerisation time=16 hours.
Rare earth component (a) concentration=0.09 millimoles per 100 g. butadiene
Component (b)=magnesium dibutyl
Component (c)=aluminium diethyl chloride.

The molar ratios used and the results (conversion, intrinsic viscosity and the polymer microstructure) are recorded in the table. It can be seen that the best results in terms of conversion and cis content are those in Examples 15, 19 & 20. Thus, under the conditions used, an Al:Mg:Nd ratio of 15:10:1 can be changed to 15:6:1 without substantially affecting conversion, cis content or intrinsic viscosity, hence reducing the magnesium alkyl requirement considerably. Reducing the magnesium alkyl:rare earth compound molar ratio, (b):(a) to below 6:1, caused the catalyst to become unstable and partial or complete precipitation occurred under these particular conditions (Examples 21 to 23). Altering the total alkyl to rare earth component ratio from the optimum (Example 15) is not beneficial, although high cis content polymer is still obtained at quite high conversion (e.g. Examples 13, 14, 16 & 17). The halogen to rare earth ratio is however an important factor and is preferably 12:1 to 17:1 under the conditions employed.

Examples 13 to 23.

| Ex. No. | Ratio of components | Ratio of | Conv. % | I.V. | Trans % | Cis % | Vinyl % | Comment |
|---|---|---|---|---|---|---|---|---|
| | Al:Nd:Mg | Al:Mg | | | | | | |
| 13 | 22.5:1:15.0 | 1.5:1 | 93.0 | 5.7 | 5.5 | 93.9 | 0.6 | Lumps formed initially later dispersed |
| 14 | 18.7:1:12.5 | 1.5:1 | 93.4 | 5.6 | 4.4 | 94.9 | 0.7 | |
| 15 | 15.0:1:10.0 | 1.5:1 | 97.8 | 7.8 | 1.3 | 98.4 | 0.3 | Normal. |
| 16 | 11.3:1:7.5 | 1.5:1 | 91.9 | 5.9 | 1.9 | 97.6 | 0.5 | Clearer, nearly colourless. |
| 17 | 7.5:1:5.0 | 1.5:1 | 89.7 | 8.8 | 1.1 | 98.5 | 0.4 | |
| 18 | 3.8:1:2.5 | 1.5:1 | 1.9 | — | 1.2 | 98.1 | 0.7 | — |
| | Al:Nd:Mg | Al:Nd | | | | | | |
| 19 | 15:1:7.5 | 15:1 | 98.8 | 5.5 | 1.5 | 98.2 | 0.3 | Normal |
| 20 | 15:1:6.3 | 15:1 | 99.3 | 6.2 | 1.2 | 98.4 | 0.4 | Normal |
| 21 | 15:1:3.2 | 15:1 | 4.7 | — | — | — | — | Partial ppt |
| 22 | 15:1:2.5 | 15:1 | 0.7 | — | — | — | — | Complete precipitataion. |
| 23 | 15:1:1.3 | 15:1 | Trace | — | — | — | — | |

I claim:
1. A process for the polymerisation of one or more conjugated diene monomers as the sole polymerizable monomers by means of a catalyst comprising

(a) a salt of a rare earth element or a complex of a rare earth element;
(b) an organo magnesium compound and
(c) a Lewis acid wherein the catalyst is formed by mixing component (a) with component (c) before contact with component (b).

2. A process according to claim 1 wherein the mixing is carried out in the presence of monomer.

3. A process according to claim 1 carried out in hydrocarbon solvent wherein the monomer is dissolved in the solvent and the catalyst components added in the order component (c), component (a) and finally component (b).

4. A process according to claim 1 wherein component (a) comprises a compound of neodymium.

5. A process, according to claim 1 wherein the organomagnesium compound is a dihydrocarbyl magnesium compound.

6. A process according to claim 5 wherein the organomagnesium compound is a dialkylmagnesium compound where each alkyl group has 1 to 10 carbon atoms.

7. A process according to claim 1 wherein the Lewis acid is an aluminium alkyl halide.

8. A process according to claim 3 wherein all three components are soluble in the hydrocarbon solvent.

9. A process according to claim 1 wherein component (a) is used in a concentration of 0.05 to 1.00 millimoles per one hundred grams of diene monomer.

10. A process according to claim 9 wherein component (a) is used in a concentration of 0.05 to 0.26 millimoles per one hundred grams of diene monomer.

11. A process according to claim 1 wherein the molar ratio of component (a) to component (b) is 0.01:1 to 0.5:1.

12. A process according to claim 11 wherein the molar ratio of component (a) to component (b) is 0.06:1 to 0.3:1.

13. A process according to claim 7 wherein the atomic ratio of halide in component (c) to rare earth metal in component (a) is 12:1 to 17:1.

14. A process according to claim 1 wherein the catalyst is prepared by adding an aluminium alkyl halide to conjugated diene monomer (s) dissolved in hydrocarbon solvent, then adding a hydrocarbon soluble compound of neodymium and finally a hydrocarbon soluble magnesium dialkyl.

15. A process according to claim 14 wherein the neodymium compound is used in a concentration of 0.05 to 1.00 millimoles per one hundred grams of diene monomer used.

16. A process according to claim 15 wherein component (a) is used in a concentration of 0.05 to 0.26 millimoles per one hundred grams of diene monomer used.

17. A process according to claim 14 wherein the molar ratio of component (a) to component (b) is 0.01:1 to 0.5:1.

18. A process according to claim 17 wherein the molar ratio of component (e) to component (a) is 0.06:1 to 0.3:1.

19. A process according to claim 14 wherein the atomic ratio of halide in component (c) to rare earth metal in component (a) is 12:1 to 17:1.

20. A process according to claim 14 wherein the conjugated diene is butadiene, isoprene, 1,3 pentadiene or a mixture of two or more thereof.

21. A process according to claim 1 wherein the catalyst consists of (a), (b), and (c) and (c) consists of an aluminium alkyl halide.

* * * * *